United States Patent [19]

Jaecklin et al.

[11] 3,786,168

[45] Jan. 15, 1974

[54] HOLDER MEMBER FOR A DISC-SHAPED SEMICONDUCTOR ELEMENT

[75] Inventors: André Jaecklin, Ennetbaden; Siegfried Strässler, Wettingen, both of Switzerland

[73] Assignee: Brown, Boveri & Company Ltd., Baden, Switzerland

[22] Filed: Mar. 6, 1972

[21] Appl. No.: 231,959

[30] Foreign Application Priority Data

Mar. 11, 1971 Switzerland ........................ 3691/71

[52] U.S. Cl. ........ 174/15 R, 174/DIG. 5, 317/234 A

[51] Int. Cl. ............................................. H05k 7/20

[58] Field of Search ..................... 174/DIG. 5, 15 R, 174/15 BH, 16 R; 317/234 A

[56] References Cited

UNITED STATES PATENTS

| | | | |
|---|---|---|---|
| 3,619,473 | 11/1971 | Meyerhoff et al. | 174/15 R |
| 3,226,466 | 12/1965 | Martin | 174/15 R |
| 3,652,903 | 3/1972 | Eriksson et al. | 174/15 R |

*Primary Examiner*—Bernard A. Gilheany
*Assistant Examiner*—A. T. Grimley
*Attorney*—David Toren et al.

[57] ABSTRACT

A holder member for a disc-shaped semiconductor element includes a pair of spaced support plates each resiliently biased against one of a pair of pressure plates which are sandwiched between them. The semiconductor element is held between the pressure plates. The contacting surfaces between the support plates and the pressure plates each has a different radius of curvature. Various embodiments of the contacting surfaces between the support plates and the pressure plates include a convexly shaped projection on one with a convex, concave or planar surface on the other. Further, the contacting surfaces can be provided by intermediate members positioned between the oppositely facing plates and with the intermediate members having a convex or spherically shaped contacting surface.

3 Claims, 8 Drawing Figures

HOLDER MEMBER FOR A DISC-SHAPED SEMICONDUCTOR ELEMENT

SUMMARY OF THE INVENTION

The invention is directed to a holder member or device which clamps at least one disc-shaped semiconductor element between a pair of pressure plates and, more particularly, it concerns a clamping arrangement for biasing the pressure plates against the semiconductor element in which the contacting surfaces between the clamping means and the pressure plates each has a different radius of curvature.

Holding devices are known for securing one or several disc-shaped semiconductor elements between cooling bodies, see DAS U.S. Pat. No. 1,276,209. Clamping means are provided in these known devices for pressing the cooling bodies through the medium of springs against the semiconductor elements. Between the cooling bodies and the clamping means or adjacent cooling bodies, intermediate elements are arranged which have a convex or concave pressure surface and bear against a complementary surface on a juxtaposed element. As a result, the intermediate elements act as a joint and insure a uniform surface pressure acting on the semiconductor elements.

However, in these known holding devices, the articulating effect of the intermediate elements is limited, particularly when high surface pressures are involved, because under such conditions dry friction occurs between the bearing surfaces of the joint.

Accordingly, it is the primary object of the present invention to provide a holder member for semiconductor elements which ensures, on one hand, a sufficient surface pressure, while, on the other hand, it avoids an irregular surface pressure which jeopardizes the semiconductor elements. Therefore, in accordance with the present invention, the semiconductor element is positioned between a pair of pressure plates and a clamping device acts on the outer surfaces of the pressure plates for biasing them into contact with the semiconductor element. The required surface pressures acting on the semiconductor element are provided by forming the contacting surfaces between the pressure plates and the clamping device so that the contacting surfaces have different radii of curvature.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
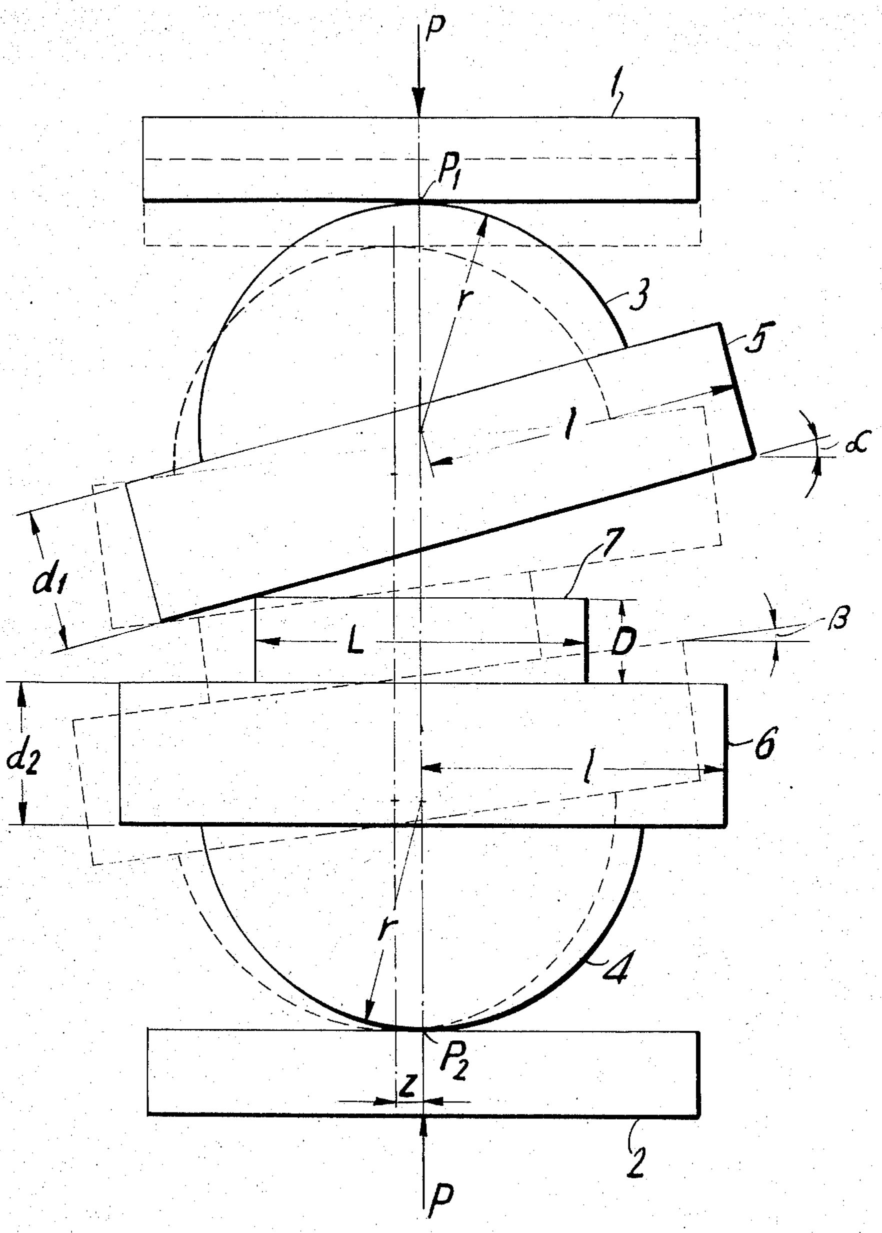
FIG. 1 is a schematic arrangement illustrating the basic concept underlying the invention.

In FIG. 1 a diagrammatic showing of a holder device is provided, with all non-essential details omitted, for describing the basic concept underlying the present invention.

The force P is applied to a pair of planar support members 1, 2 each of which is in contact with a dome-shaped element 3,4 having a radius $r$. Rigidly secured to each of the dome-shaped elements 3 and 4 along a side thereof spaced from the support members is a circular cylinder 5,6 having a radius 1 and the height $d1$,$d2$, respectively. Positioned or sandwiched between the adjacent surfaces of the circular cylinders 5,6 is a disc-shaped semiconductor element 7 having a diameter L and a constant thickness D, which rests in a loose manner on the upper face of the bottom cylinder 6.

It is assumed that the two bearing points P1,P2 between the support members 1,2 and the dome-shaped elements 3,4 are in vertical alignment and that the upper face of the lower or bottom cylinder 6 and the corresponding lower face of the semiconductor element 7 are horizontal. This particular arrangement is shown in solid lines in FIG. 1. These assumptions simplify the geometry of the drawing without limiting its general validity. An error in the parallel disposition of the lower end face of the upper cylinder 5 and the upper end face of the lower cylinder 6 may be due to the arrangement of the upper cylinder with its plane-parallel end faces inclined at an angle $\alpha$ to the horizontal.

When the force P is applied perpendicularly to the outwardly directed surfaces of the support members 1 and 2, the two dome-shaped elements 3,4 including the cylinders 5,6, respectively, connected to them move or roll into a mutually parallel position as soon as the top cylinder contacts the corresponding surface of the semiconductor element 7. Based on the foregoing assumption, that is that the surfaces of the semiconductor element are in exactly plane-parallel relationship, then both end faces of the cylinders 5,6 contacting the semiconductor element have the same angle $\beta$ relative to the horizontal. If the heights of the cylinders and the radii of the dome-shaped elements are equal, then the angle $\beta$ is equal to $\frac{1}{2}\alpha$. There is no danger that the semiconductor element would be subjected to excessive lateral stress during contact, since such stress represents only a fraction, about one part in a thousand, of the force P acting on the support members 1,2. The reason for this low stress is due to the very low friction resistance to the rolling movement of the dome-shaped elements 3,4.

While, as shown in FIG. 1, the two circular cylinders 5 and 6 turn toward one another, the entire holding device moves laterally by an amount $z$. The extent of the lateral displacement $z$ is determined as follows:

$$z = r\beta.$$

It is important that, despite this movement, the force P acts exactly centrally. Thus, it follows that the shearing forces acting on the semiconductor element 7 are limited to the amount determined by the angle $\beta$ which measures the inclined position of the cylinders from the horizontal. Naturally, it will be apparent that the force P can no longer act centrally, if, a) the bearing points P1 and P2 are not vertically aligned in the starting position, and b) the two dome-shaped elements 3,4 have different radii, *r*1 and *r*2, respectively.

If the first requirement is not met, the bearing points P1 and P2 are displaced by the same amount, if the second requirement is not met, the bearing points are displaced by different distances, determined as follows.

$z1=r1\times\beta$; $z2=r2\times\beta$

Therefore, depending on the starting position of the holding device, the line of action of the forcc P, that is, the connecting line between the two bearing points P1 and P2 can be displaced laterally parallel to itself or it can assume an angle $\gamma$ relative to the vertical. The maximum angle $\gamma$ formed between the line of action and the vertical must not exceed the so-called adhesive friction angle $\gamma$-max. With a minimum coefficient of adhesive friction $\mu_H=0.15$, a $\gamma$-max $=\arctan \mu_H=8.5°$ is obtained. This condition can be met, however, with relatively simple means.

Figure 2A:
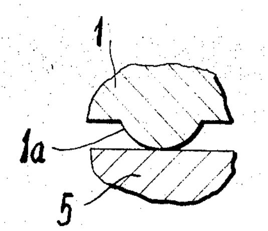
FIG. 2 is a cross sectional view of a holder member for a disc-shaped semiconductor element illustrating one embodiment of the arrangement of the contacting surfaces within the holder member and FIGS. 2A–2A′, 2B–2B′ and 2C–2C′ show other embodiments of the contacting surfaces.
Figure 2B:
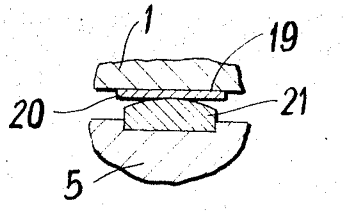
Figure 2C:
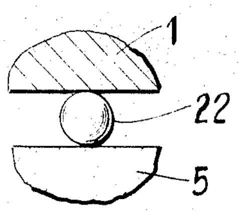
Figure 2:
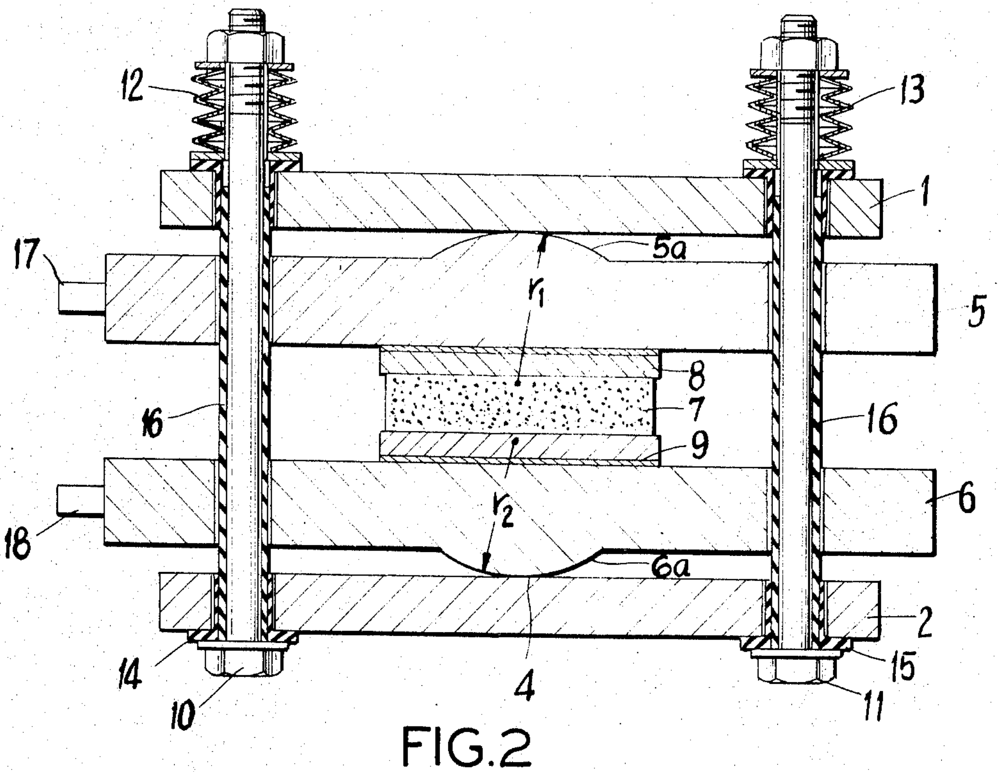
Figure 2A:
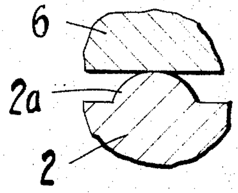
Figure 2B:
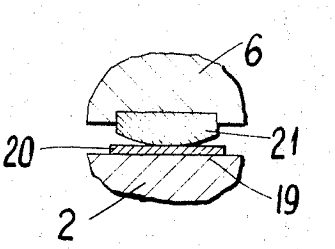
Figure 2C:
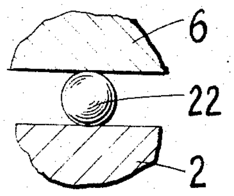

Founded on the foregoing basic concept, the following is a description of the embodiments represented in FIG. 2 of a holder member for a disc-shaped semiconductor element.

In the holder member or device shown in FIG. 2, a semiconductor element 7 of monocrystalline material, for example, silicon, has one or several *pn*-junctions. The edge of the semiconductor element is bevelled in a known manner for increasing the dielectric strength. The contact surfaces of the semiconductor element 7, that is, the surfaces directed upwardly and downwardly in FIG. 2, are each connected to a carrier plate 8,9. The carrier plates 8,9 are formed of the material whose coefficient of expansion corresponds to that of the material forming the semiconductor element. The carrier plates 8,9 are joined, with the inter-position of thin foils of a ductile material, to pressure plates 5,6 formed of copper or of a copper alloy and intended to be used as cooling bodies.

The semiconductor element 7 along with the carrier plates 8,9 and the pressure plates 5,6 are clamped between a pair of spaced supports 1 and 2, similar to the arrangement shown in FIG. 1. In the arrangement shown in FIG. 2, the outwardly directed faces of the pressure plates 5,6, that is, the surfaces facing outwardly away from the semiconductor element 7, each has a centrally arranged convexly shaped projection 5*a*, 6*a*. These projections can be designed as dome-shaped elements, such as shown in FIG. 1. The surfaces of the support plates 1,2 directed inwardly toward the semiconductor element, are in pressure contact with the projections 5*a*, 6*a* and, according to the present invention, have a different radius of curvature. In FIG. 2 the surfaces of the support plates 1,2 contacting the projections are planar, that is, they have an infinite radius of curvature. As an alternative, it may be advantageous if the outwardly facing surfaces of the pressure plates 5,6 are planar and dome-shaped projections 1*a*,2*a* are provided on the surfaces of the support plates 1,2 as indicated by the embodiment designated in FIG. 2A–2A'. The embodiment in FIG. 2A–2A' permits the assembly of several arrangements, each consisting of two pressure plates and the semiconductor element, between the support plates, in the form of a column. Another possible embodiment, though not shown in the drawing, would be to provide one of the contacting surfaces of the pressure plates with a projection while the corresponding surface of the support plate is planar and forming the other contacting surface of the pressure plates planar while the corresponding surface of the support plate is provided with the projection.

To provide the requisite clamping pressure in the holder member, a pair of clamping bolts 10,11 are arranged extending between and through the support plates 1,2. A series of cup springs 12,13 are provided on the clamping bolts 10,11 adjacent the support plate 1. Further, to provide the necessary separation of the potential between the two support plates, the bolts 10, 11 are separated from the surfaces of the support plates by insulating members 14,15. In addition, an insulating jacket 16 is positioned about each of the clamping bolts 10,11 for the extent of the bolts passing through the support plates and the pressure plates. If the lateral projection of the cooling bodies exceeds the distance of the bolts from the longitudinal or central axis of the holder device, the cooling bodies or pressure plates 5,6 must be provided with corresponding recesses, not shown in FIG. 2. Moreover, care must be taken that a sufficient spacing is maintained between the clamping bolts and the pressure plates so that any radial movement of the holder member is not disturbed due to contact between the clamping bolts and the remaining structure of the holding device.

It is not advisable to effect the supply and discharge of current over the contacting surfaces between the pressure plates and the support plates. Therefore, each of the pressure plates 5,6 is provided with a connecting electrode 17,18 respectively. However, if the pressure contacting surfaces between the support plates and the pressure plates are insulated, means for separating the potential between the supports are not necessary. This separating effect can be carried out by insulating the portion of the support plates in contact with the projections on the pressure plates from the parts of the support plates which carry the clamping bolts or other fastening means. This alternate arrangement is shown by the embodiment set forth in FIG. 2B–2B'. In this variation, steel plates 20 are fixed to the surface of the support plates 1,2 facing toward the pressure plates 5,6 and an insulating layer 19 is positioned between the steel plates 20 and the support plates 1,2. Additionally, it is possible to provide a intermediate piece 21 in the surface of the pressure plate with a convexly shaped surface contacting the plate 20 in place of the projections 5*a*, 6*a* shown in FIG. 2. The above embodiments can also be used when potential separation is not required and in such an instance the insulating layer can be eliminated.

Another variation of the contacting surfaces between the support plates 1,2 and the pressure plates 5,6 is shown in the embodiment of FIG. 2C–2C' where a spherically shaped intermediate piece 22 is positioned between the juxtaposed surfaces of the support plates and pressure plates.

In the practical realization of the invention, care must be taken that the maximum surface pressure of the abutting contact surfaces, that is the contacting surfaces between the support plates and the pressure plates, remain below the elastic limit (Hertz pressure). By selecting the radius of curvature of the contacting surfaces as well as a suitable material for the surfaces, it is possible to meet the required condition for any desired clamping pressure.

Thus the minimum contact radius (*r*-min) for the abutting or contacting surfaces, where the surfaces are formed of tempered steel with a modulus of elasticity $E=2.1 \times 10^4 kg/mm^2$, a clamping force of P=2,000kp and an elastic limit of 200 $kg/mm^2$ is $r_{min} = 82$ mm.

This radius can be reduced if one of the contacting surfaces is designed as a concave spherical surface instead of a planar surface. However, this increases the difficulty of manufacture.

A further reduction in the minimum contact radius is possible if the holder member or device is intended only to be used a single time. The compensation for the error in parallelism is effected at a lower clamping pressure, that is, before the surface pressure in the contacting surfaces exceeds the elastic limit. In other words, where the holder member is intended to be used only once, the minimum radius of curvature corresponds to the radius of curvature at which the surface pressure of the contacting surfaces, calculating from the Hertz formula, attains at most ten times the value of the elastic limit.

The invention is not intended to be limited to semiconductor elements which are connected to carrier plates on one or both of its end faces. It is particularly the uniformity of the surface pressure which can be achieved with the holder member according to the present invention, which permits in a practically ideal manner, the pressure-contacting of so-called (naked) disc elements. Furthermore, it is possible to clamp more than one semiconductor element between two pressure plates which are designed as cooling bodies.

While in the above description and in the drawing one of the contacting surfaces is convex or spherical and the other is planar, it will be appreciated that one of the contacting surfaces can be convex while the other one can be any one of convex, concave and planar surfaces.

While specific embodiments of the invention have been shown and described in detail to illustrate the application of the inventive principles, it will be understood that the invention may be embodied otherwise without departing from such principles.

What is claimed is:

1. In a holder member for holding at least one semiconductor element and having an axially extending column-like arrangement comprising a pair of pressure plates extending transversely of the axis of the column-like arrangement and disposed in oppositely arranged spaced relationship for holding the semiconductor element therebetween, at least one of said pressure plates forming a cooling body, clamping means in contact with said pressure plates for pressing said pressure plates toward one another and into contact with the semiconductor element, said clamping means includes a pair of support plate units each associated with a different one of said pressure plates and each having a surface arranged in contact with the surface of its associated said pressure plate which faces in the opposite direction from the surface thereof which contacts the semiconductor element, clamping members extending between said support plate units in the axial direction of the column-like arrangement, spring means mounted on said clamping members for biasing said support plate units together for pressing said pressure plates against the semiconductor element, the contacting surfaces of said support plate units and said pressure plates each having a different radius of curvature, said pressure plates arranged in spaced relationship in the direction extending transversely of the axis of the column-like arrangement of the holder member from said clamping members so that in the event of any movement of said pressure plate transversely of the axial direction of the column-like arrangement there is no contact between said pressure plates and said clamping members, the improvement comprising that each said support plate unit comprises a support plate located opposite and spaced from the outwardly facing surface of its associated said pressure plate, and a pair of intermediate members each seated in a different one of the oppositely facing surfaces of said support plate and pressure plate and extending into contact with the other said intermediate member, and at least one of said intermediate members of said pair having a convexly curved configuration in surface contact with the other one of said intermediate members.

2. A holder member, as set forth in claim 1, wherein said convexly curved intermediate member is seated on said pressure plate and the other said intermediate member has a planar surface in contact with said convexly curved intermediate member and is seated on said support plate.

3. A holder member, as set forth in claim 2, wherein an insulating layer is positioned between said support plate and the other said intermediate member.

* * * * *